United States Patent [19]
Tucker

[11] Patent Number: 6,158,801
[45] Date of Patent: Dec. 12, 2000

[54] VECHICLE ENCLOSURE

[76] Inventor: Kelvin Frank Tucker, 19787 SW. 85th La., Dunnellon, Fla. 34432

[21] Appl. No.: 09/185,300

[22] Filed: Nov. 3, 1998

[51] Int. Cl.[7] .................................. B60J 5/04; B60J 5/06
[52] U.S. Cl. ........................................ 296/146.1; 296/148
[58] Field of Search ................... 296/77.1, 78.1, 296/148, 190.1, 190.8, 191, 107.19, 83, 146.1; 280/DIG. 5

[56] References Cited

U.S. PATENT DOCUMENTS

| | | |
|---|---|---|
| 3,709,553 | 1/1973 | Churchill .................... 296/28 |
| 4,013,315 | 3/1977 | West .......................... 296/83 |
| 4,621,859 | 11/1986 | Spicher ..................... 296/78 |
| 4,773,694 | 9/1988 | Gerber ....................... 296/77.1 |
| 4,932,714 | 6/1990 | Chance ...................... 296/148 |
| 5,259,656 | 11/1993 | Carroll ...................... 296/77.1 |
| 5,588,690 | 12/1996 | Showalter ................. 296/77.1 |

*Primary Examiner*—D. Glenn Dayoan
*Assistant Examiner*—Sy Blankenship

[57] ABSTRACT

My application is a sliding, collapsible door for the occupant compartment of a vechicle.

The door is described as part of a golf cart enclosure, but is not limited to that application. Size and shape modifications can adapt the concept to other limited travel vechicles.

1 Claim, 4 Drawing Sheets

FIG. 3
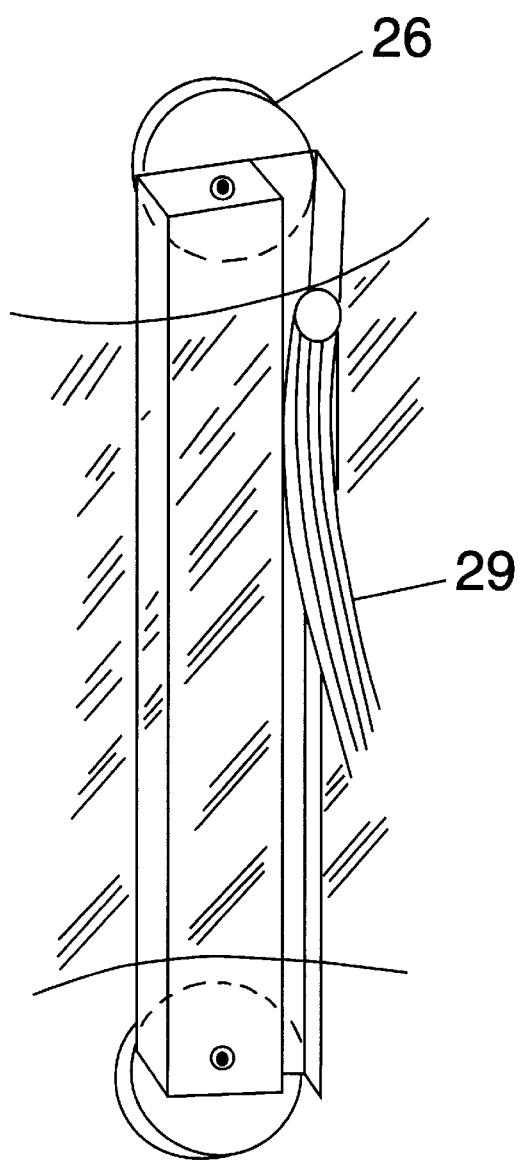
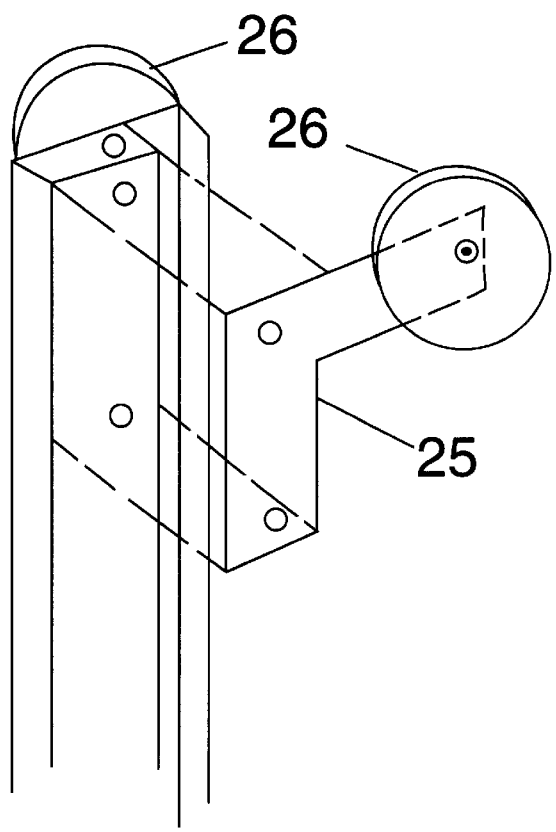
FIG.4

VECHICLE ENCLOSURE

FIELD OF INVENTION

This invention protects vechicle occupants from the weather. The enclosure can be used on golf carts, tour vechicles, maintenance buggies, fork lift trucks, etc.

The drawings and explanations describe the enclosure applied to a golf cart. Other applications would require specific size and shape modifications.

DESCRIPTION OF PRIOR ART

Golf carts after manufacture are generally outfitted with a roof and a windshield. This leaves the sides and the back open to the weather. Most golf cart covers are a canvas material with small vinyl windows. They cover the top, drape down the sides, and are attached with VELCRO, stretch straps, and snaps. The sides and back are zippered to allow entry-exit and access to the golf clubs.

The zippered panels are rolled up for storage and rolled down for protection. Rolling and folding the panels is awkard and entraps moisture causing mildew. The rolling and folding process eventually cracks the vinyl and canvas requiring repair or replacement. Visibility is limited because of the small vinyl windows and the effects of mildew and cracking.

Churchill patent no. 3,709,553 (1973) has sliding transparent curtains that tie into bundles. The curtains cover the windshield, sides, and back and are held down by snaps. I reference Churchill because his invention is the only one that moves horizontally, but it fails to provide easy entry or exit capabilities.

West patent no. 4,013,315 (1977) has transparent panels with tie cords. A makeshift arrangement held by suction cups and hooks.

Spicher patent no. 4,621,959 (1986) utilizes a hinged pipe frame door. This helps the entry-exit problem, but causes a door storage dilema.

Gerber patent no. 4,773,694 (1988), Carroll patent no. 5,259,656 (1993), and Showalter patent no. 5,588,690 (1996) all use roll-up curtains with zippers and snaps. In addition Showalter has a double back of questionable value. All of the roll-up covers have the same inherent problems of cumbersome folding, rolling, and mildew.

All of the references cited provide reasonable protection from the weather. The problem they all have, except Churchill and Spicher, is an implementation in a vertical rather than a horizontal manner.

The main object of the present invention is ease of use by having a horizontal collapsible door. Open and close the door is all. No panels to roll up. No zippers, no strech cords.

My enclosure is a semi-permanent attachment to a golf cart that provides good entry-exit space, easy use, good visibility, low maintenance, and long life.

OBJECTS AND ADVANTAGES

Objects of this invention are 1) a reasonably weathertight enclosure, 2) good exit-entry space, 3)ease of use, 4) low maintenance, 5) good visibility, 6) durability, and 7) aesthetically pleasing appearance. Earlier enclosures have satisfied weather protection reasonably well. They all have been sadly remiss in satisfying ease of use and exit-entry capabilities. The all vinyl approaches have aided maintenance, durability, and field of vision. None are aesthetically pleasing because of rolled-up panels, straps, bundles, pipe frame doors, etc.

My enclosure does the following:
a) provide weather protection for the golf cart occupants;
b) provide good visibility for driver and occupant;
c) provide an easy to use enclosure with good entry-exit capabilities;
d) provide a low maintenance enclosure;
e)provide a durable, long life enclosure.
Its advantages over prior art are:
a) better visibility than most;
b) easier to use with wide entry-exit space;
c) lower cleaning maintenance and no adjusting straps, oiling zippers, replacing cracked panels, etc.;
d)better durability than previous models. My enclosure will last several times longer than previous art. Further objects and advantages of my invention will become apparent from a consideration of the drawings and ensuing description.

DESCRIPTION OF DRAWINGS

FIG. 3 Exploded view of vertical side bars with wheels, vinyl, and spline.

FIG. 4 Exploded view of top of closure bar with a stabilizer attachment.

---

Reference Numerals in Drawings

Figure 1A:
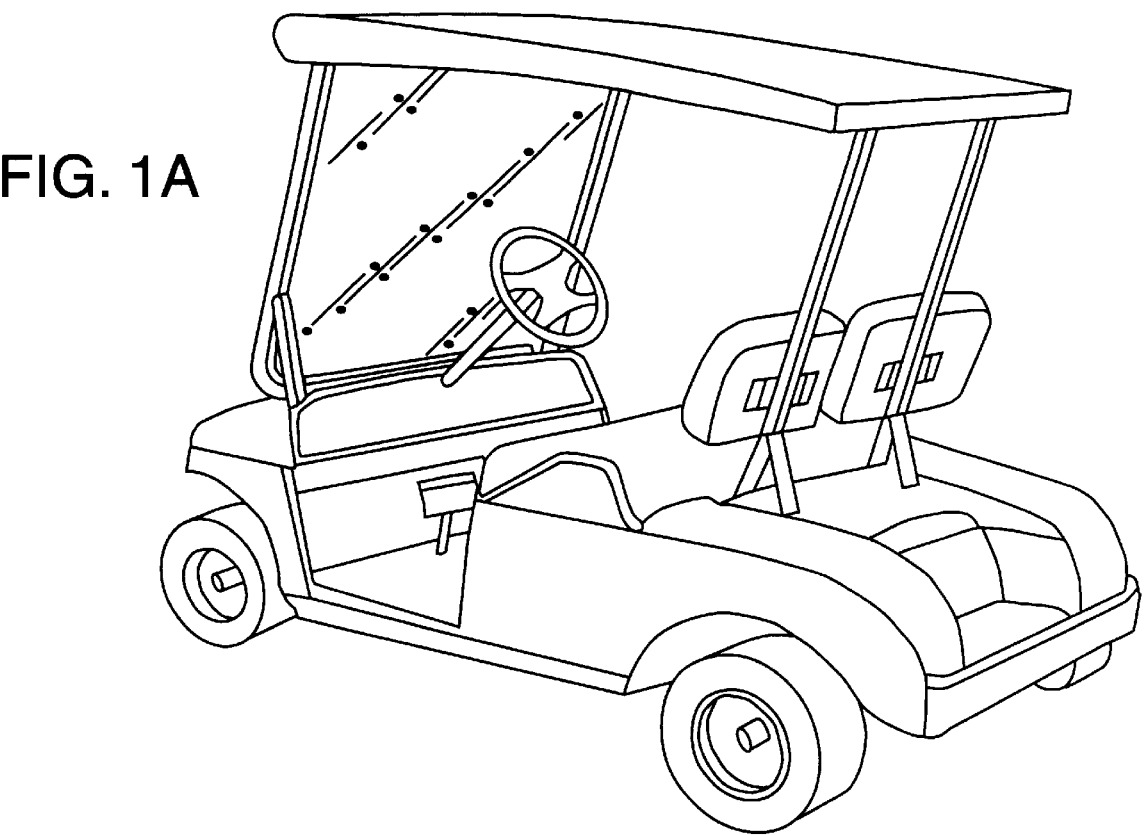
FIG. 1A Golfcart with 4 upright aluminum bars supporting a roof and plastic windshield. The wire basket and golf bag holders are deleted for simplicity.
Figure 1B:
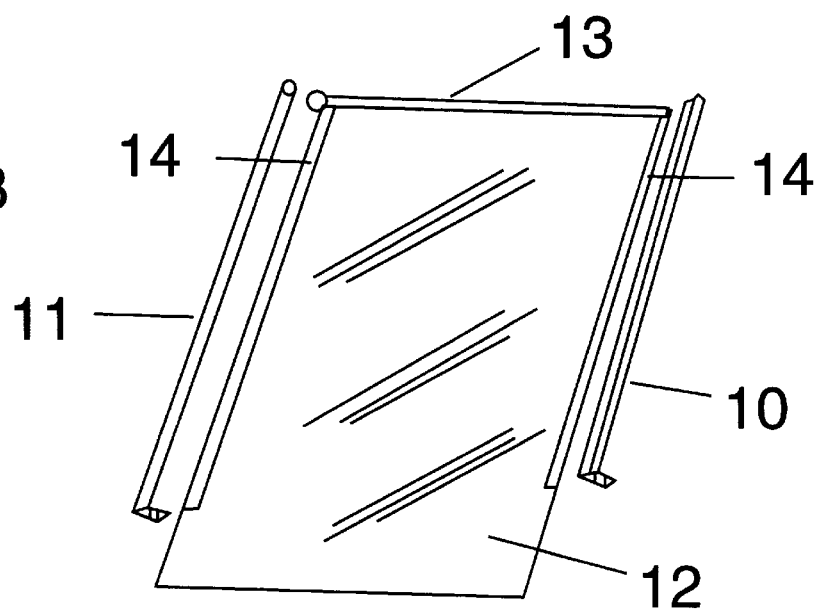
FIG. 1B The components of applicants invention to enclose the rear of the occupants compartment. There are 2 90° angle bars. Also there is a vinyl panel with a roll-up bar at the top.
Figure 1C:
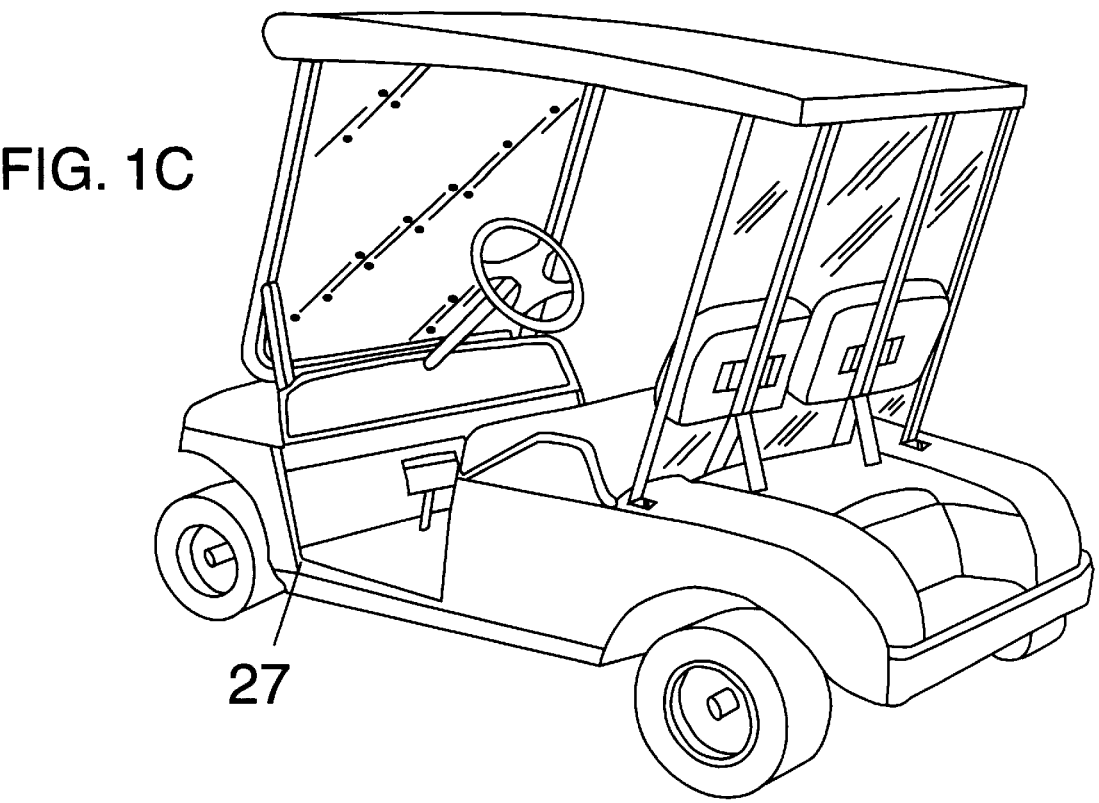
FIG. 1C Golfcart with rear enclosure in place.

10 Right rear corner bar
11 Left rear corner bar
12 Vinyl back panel
13 Back panel roll-up bar
14 Hook and loop fastening
15 Door open spring
16 Stationary bar
17 Closure bar
19 Upper guide channel
20 Door closed spring
21 Lower guide channel
22 Vinyl left side panel
23 Grommet
24 Carrier bars
25 Stabilizer attachment
26 Wheel; one wheel on each inside top and bottom of 16, 17, 24, and outside on 25
27 Point where cart floor meets trim on cart front fender
29 Spline

---

SUMMARY OF INVENTION

Applicant's enclosure for a golf cart provides a durable weatherproof cover. Good visibility and low maintenance are inherent with the design. The premium features are abundant entry and exit space and ease of operation.

DESCRIPTION OF INVENTION

Applicant's invention is to enclose the occupants compartment of a golf cart. This does not include the golf clubs on the rear of the cart. My invention presumes a roof and windshield are in place. The invention encloses the rear and both sides of the occupants compartment. Only the left side is referred to and shown, because the right side is exactly the same but opposite.

The back panel is installed first. Two rear corner bars; right 10, left 11, are top bolted to the roof and bottom bolted to the golf cart rear fenders. The bars are installed in the same plane as the back of the back rests. There are hook and loop fasteners on the forward and outside faces of each corner bar. Back rest removal preceeds the installation of back panel 12 between the two rear corner bars; 10 and 11. The back panel 12 has hook and loop material sewn to each side. This engages the hook and loop material on the forward faces of the rear corner bars. The back panel roll up bar 13 goes to the top and is held there by a clip at each end. The bottom end of back panel 12 goes under the seat,which lifts from the rear. Reinstallation of the back rests completes the enclosure of the back.

Figure 1D:
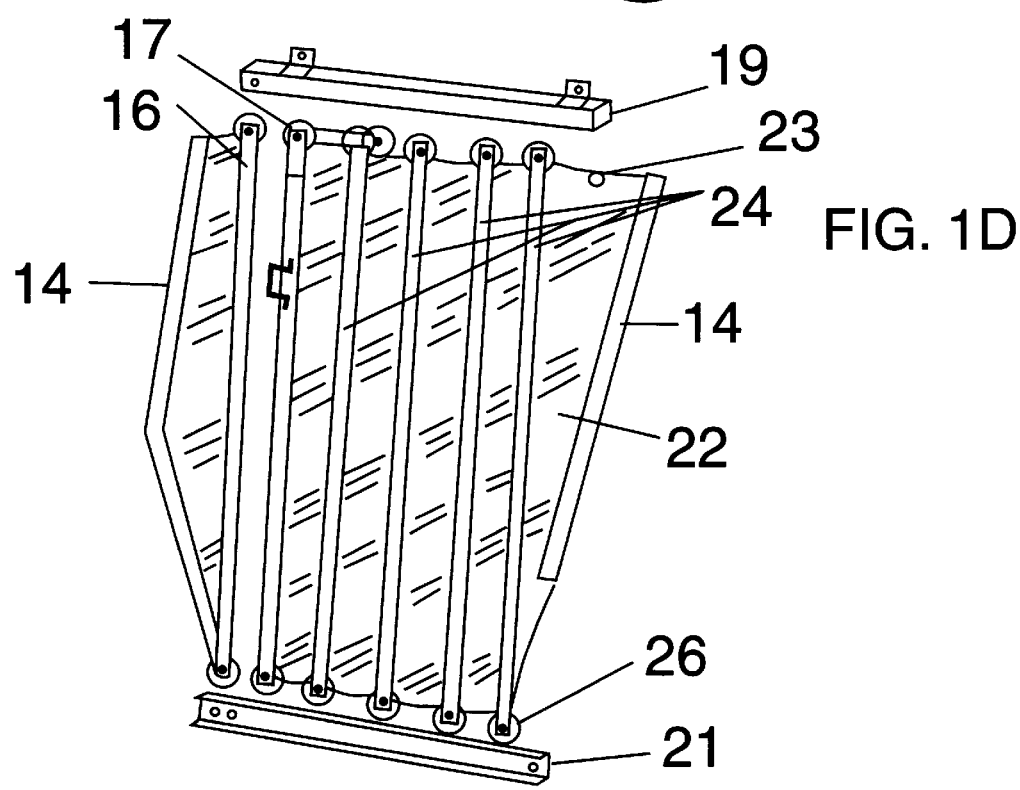
FIG. 1D The components of my enclosure for the left side of the golf cart. The right side is not shown because it is exactly the same but opposite in orientation.
Figure 1E:
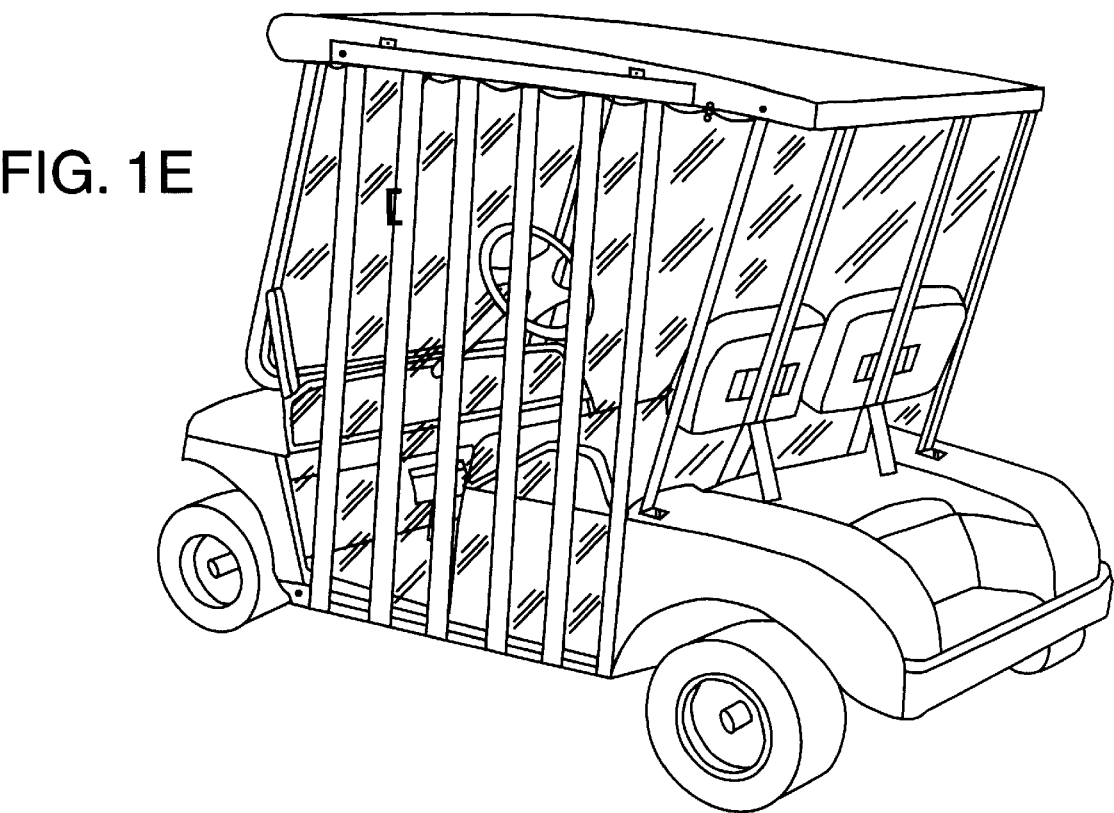
FIG. 1E Golfcart with side enclosure attached—about 6 inches from closed position FIG. 2 Enlarged view of the upper and lower guide channels.
Figure 2:
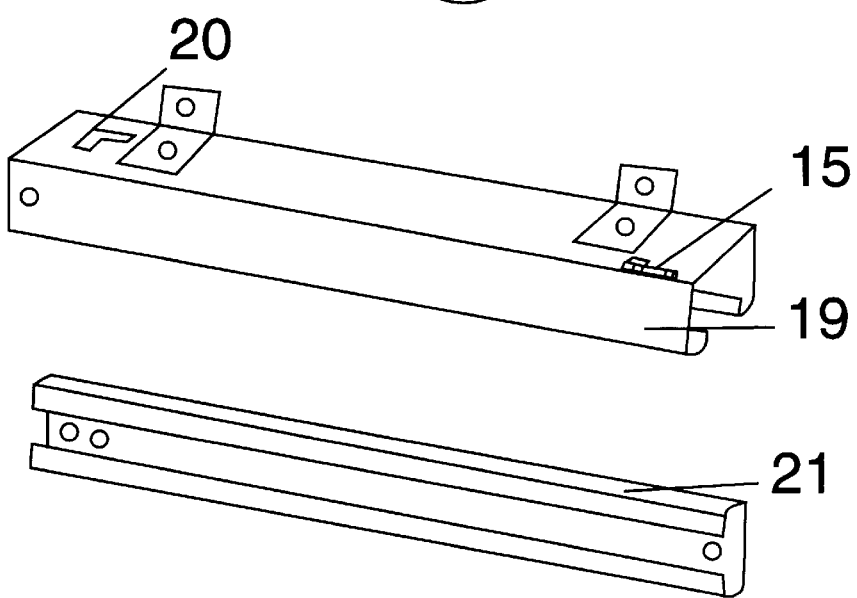

The side enclosure FIG. 1D basically consists of four parts or assemblies; upper guide channel, or dual track top guide channel, 19, lower guide channel, or bottom guide channel, 21, stationary bar 16 and panel, and the closure bar 17 and panel. Geometry is important for installation and operation. The guide channels, upper and lower, must be parallel. The front of the upper guide channel is attached to the roof at a point approximately vertical from the point where the cart floor meets the trim on the cart front fender 27. Since the roof tilts to the rear, the exact point is slightly behind the vertical. This allows the stationary bar 16 to be at right angles with both the upper guide channel 19 and the lower guide channel 21.

The rear of the upper guide channel 19 is then bolted to the roof. The closure bar 17 assembly is slid into the upper guide channel 19. The stationary bar 16 is also slid into the upper guide channel 19. Then the lower guide channel 21 is slid onto the bottom wheels. The lower guide channel is attached with two bolts to the cart frame.

The hook and loop 14 on the rear of the closure bar panel is fastened to the left rear corner bar 11 outside face of hook and loop. The front of the stationary panel is fastened by hook and loop 14 to hook and loop material on the left front roof support bar and hook and loop on the trim on the golf cart fender 27. A tie wrap thru grommet 23 and a drilled hole in the cart roof holds the back of the side panel firm. This completes the left side enclosure and the right side is the same but opposite.

A more detailed description of the side enclosure parts follows. The upper guide channel 19 is double channeled. The wheels on stationary bar 16, closure bar 17, and carrier bar 24 all run on the inside channel. The outside channel is used solely by a wheel attached to stabilizer plate 25 on the top of closure bar 17. The stabilizer plate wheel runs alone so it can bypass other wheels. This allows the door to collapse and not rack when opening or closing.

Lower guide channel 21 is a single channel. Both the upper and lower guide channel rear bolts act as backstops for the wheels. Both the upper and lower guide channels have protruding bolts ahead of the stationary bar to keep the stationary bar in the channels.

All of the bars, stationary, closure and carrier, have wheels on the inside top and bottom. Vinyl is affixed to the bars by a spline 29 FIG. 3 rolled into the side slot on the bars. This creates a fold out effect and causes the vinyl to form pleats between the bars when the door is opened (collapsed). When the door is closed, the vinyl flattens out.

The closure bar 17 shown in FIG. 4 has a stabilizer plate attached at the top to reduce racking during door movement. A handle is on closure bar 17 about two thirds of the way up.

Operation

The enclosure needs to be installed according to the geometry outlined previously in Description of Invention. Parallel upper and lower guide channels allow the closure panel to move easily. The proper positioning of the stationary bar provides a close fit when the closure panel is moved forward. Springs, 15 and 20 in the upper guide channel engage the wheels to keep the door open or shut.

The back panel can be rolled down, on the seat backs, if additional ventilation is desired.

The upper and lower guide channels 19 and 21, will be made of aluminum but could be steel or plastic. The bottom raceways will be round to accommodate wheels of a similar shape. The raceways could be flat or v shaped.

The wheels will be nylon but could be made of a rubber like substance or another plastic material.

The vertical bars 16, 17, and 24 are aluminum screen framing. When the spline is rolled into the grooves on the aluminum bars, the vinyl is crimped and folds out. The folding action enhances the pleating required when the door is opened and the panel collapses.

Hook and loop fastening, probably VELCRO, is preferred because it forms a tighter closure than snaps, turn buttons, straps, etc.

Conclusion

While my above description contains many specifications, these should not be construed as limitations on the scope of the invention, but rather as an exemplification of one preferred embodiment thereof. Many other variations are possible. Golf carts differ slightly in size and shape. After market tops and supports are also different. Minor adjustments are easily made to accommodate these differences and do not limit the invention.

Also the application of this invention to other than golf cart vechicles is not limited because again only size and shape modifications are required. The basic logic and operation are the same.

My invention is a new use of an old idea—folding closet or shower doors. These doors generally had panels that folded to collapse the door. My invention has pleats which are easily created when the vinyl is rolled into the vertical bars. This pleating action is novel and necessary for the folds to form rather than caving in. Also, the use of the proper vinyl gauge and stiffness enhances folding. Ease of operation is enhanced with neat fold out panels.

The concept of collapsible doors satisfies a long felt, but unsolved need, for a better golf cart enclosure.

Many golf cart covers have been invented, but none were successful against the old canvas covers. My approach uses an old idea in a new way. Some people thought it wasn't possible to put sides on a golf cart: Chapman patent no. 5,146,967 (1992) page 1 line 25; "To put sides on a golf cart would defeat its purpose of being open and accessible."

In conclusion, my invention is the result of a series of prototypes. Improvements in the combination of guide channels, wheels, support bars and a horizontal implementation have produced a golf cart enclosure that works for the golfer.

What is claimed is:

1. A golf cart door comprising:

a clear rectangular vinyl sheet;

a dual track top guide channel;

a bottom guide channel below and parallel to the top guide channel;

a plurality of vertical carrier bars attached to said clear rectangular vinyl sheet, wherein each of said vertical carrier bars has a top end and a bottom end;

a plurality of wheels, wherein one of said plurality of wheels is attached to the top and the bottom end of each of said vertical carrier bars;

wherein the wheels attached to the top end of said vertical bars are rollably received in said dual track top guide channel and wherein the wheels attached to the bottom end of said vertical carrier bars are rollably received in said bottom guide channel;

a vertical stationary bar attached to one end of both the dual track top and bottom guide channels;

a stabilizer attachment at the top end of one of said vertical carrier bars, the one of said vertical carrier bars is close to said vertical stationary bar than any other of said vertical carrier bars;

wherein a closed door position is defined by said vinyl sheet being fully extended so as to include a portion that is adjacent to said vertical stationary bar and an open door position is defined by said vinyl sheet being at least partly collapsed with said portion of the vinyl sheet being spaced from said vertical stationary bar.

* * * * *